Jan. 10, 1961  C. G. ARENGO  2,967,353
BALL-POINTED WRITING INSTRUMENTS
Filed Dec. 17, 1957  2 Sheets-Sheet 1
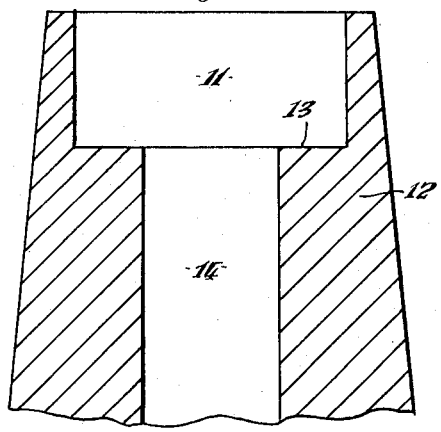
Fig.1.
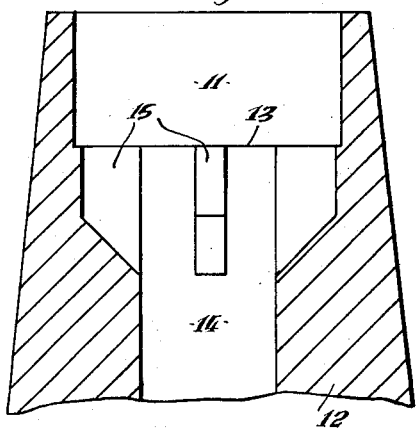
Fig.2.
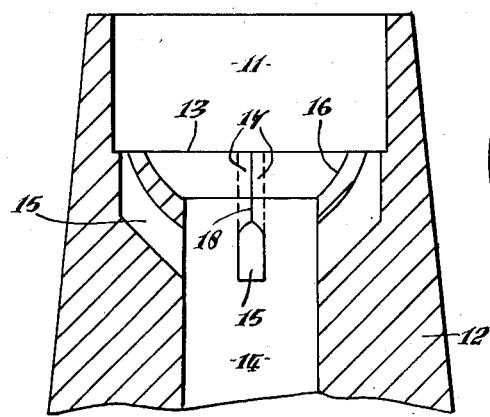
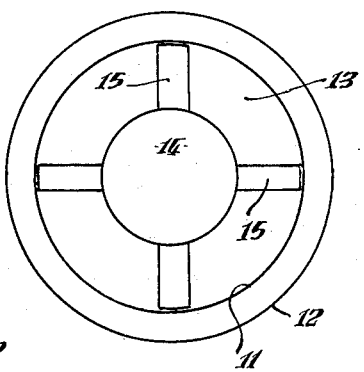
Fig.3.
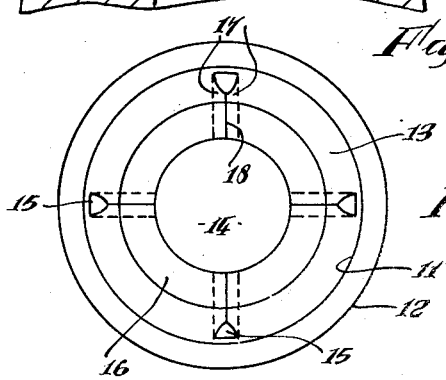
Fig.4.
Fig.5.
Inventor
Christopher Guy Arengo
by Albert Jacks
Attorney

United States Patent Office 2,967,353
Patented Jan. 10, 1961

2,967,353

BALL-POINTED WRITING INSTRUMENTS

Christopher Guy Arengo, Clifton, England, assignor to Tallon Limited, London, England, a British company Filed Dec. 17, 1957, Ser. No. 703,427

Claims priority, application Great Britain Oct. 1, 1957

6 Claims. (Cl. 29—538)

This invention relates to ball-pointed writing instruments, of the kind comprising a nib and a ball disposed freely rotatable on a base seat in a housing in the said nib, the nib being provided with a conduit which communicates at one end with the said housing and has its other end adapted to communicate either directly or indirectly with a reservoir of ink, whereby said ink may be fed to the ball and the ball may produce an ink trace, the ball being retained upon the base seat in the housing by an inturned lip on the outer end of the housing, and the inturned lip, the seat and the housing being all integral with the nib.

Hitherto, when making nibs for ball-pointed writing instruments, a cavity of a suitable size and depth to receive the ball, and having a frusto-conical or spherical base to provide a seat upon which the ball may rest, has been formed in the end of the blank from which the nib is produced to provide a ball housing. The centre of the said base has been pierced with an axial hole, approximately half the diameter of the said ball cavity, which, in turn, is adapted to communicate with the ink reservoir. Since the pressure of the ball against its base seat bearing surface would otherwise prevent the flow of ink from the said small axial hole or conduit into the interior of the ball housing or cavity, it is a normal feature of the construction of such housings to intersect the said seat for the ball with two or more grooves pierced or otherwise machined into the surface so as to interrupt the said seat and provide a series of ducts through which the ink can pass from the said small central conduit, communicating with the reservoir, to the interior of the ball housing. The presence of these ducts results in the ball being supported on a plurality of seating bearing surfaces and this has not been found to be very satisfactory because the effective area of the base seat bearing surface for the ball is reduced and the corners or edges of the said ducts, where they meet the surface of the ball, tend to act as scraping edges as the ball rotates, and such edges remove the ink from the ball in a haphazard manner which may interrupt or otherwise interfere with the proper even flow of the ink emerging from the writing tip on to the writing surface.

The object of the present invention is to provide improvements in ball-pointed writing instruments of the kind referred to, whereby a continuous or uninterrupted base seat bearing surface is provided in the housing for the ball.

A nib for a ball-pointed writing instrument of the kind referred to is characterised in that one or more tubular passages are provided below the base seat bearing surface for the ball, and the said base seat bearing surface is continuous or uninterrupted.

A method of making a nib for a ball-pointed writing instrument of the kind referred to comprises forming a cavity in the writing end of the said nib, forming a conduit which extends axially along the nib from said cavity to the other or rear end of the nib, forming at least one channel in the floor of said cavity extending outwardly from said conduit, and displacing the said floor of the cavity whereby to form a base seating for a ball and close the faces of the channels at said seating.

By the word "nib" is meant the blank completed in accordance with the above method whether or not the ball has been fixed in position therein.

By the expression "tubular passages" is meant passages of any length that are open at the ends and closed at all sides in contradistinction to "channels" which, although open at the ends, are not closed upon all sides.

The invention is illustrated in the accompanying drawings, wherein:

Fig. 1 is a sectional elevation of part of one form of nib and showing the ball housing prior to a base seating for the ball being formed therein;

Fig. 2 is a sectional elevation corresponding to Fig. 1, but showing a further stage in the production of the housing;

Fig. 3 is a plan view corresponding to Fig. 2;

Fig. 4 is a sectional elevation showing a still further stage in the production of the housing;

Fig. 5 is a plan view corresponding to Fig. 4; and

Figure 6:
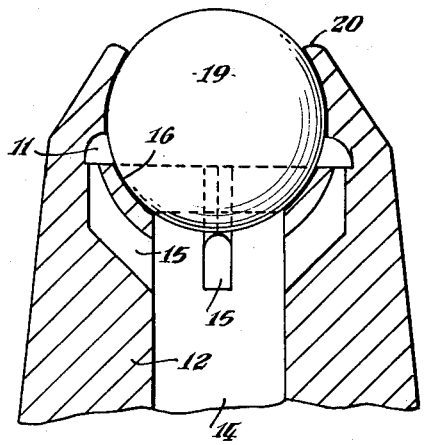
Fig. 6 is a sectional elevation of part of the completed nib, with the ball disposed on its seating and secured in the housing.

Referring to Fig. 1, a cavity 11 is formed initially in the writing end of a blank 12 so as to provide a flat floor 13, that is, a floor which is perpendicular to the axis of the nib. A conduit 14 also is formed axially in the blank for the purpose of conducting the ink, or other writing fluid, from a reservoir which is not shown.

A series of grooves 15, Figs. 2 and 3, are then made, by machining or otherwise, in the blank, surrounding the conduit 14 and extending from the floor 13. There may be, as shown in Figs. 2 and 3, four such grooves 15 which are spaced apart angularly around the duct 14. The upper ends of the grooves 15 extend outwardly along the floor 13 from the conduit 14, for example, radially, almost to the wall of the cavity 11.

A suitable tool is passed into the cavity 11 and on to the floor 13 at the end of the conduit 14. The tool may be provided with means to ensure that it is disposed co-axially of the cavity 11 and conduit 14; for example, the tool may comprise a spherical end of a diameter equal to that of the writing ball which is to be disposed in the housing, together with a spigot extending from the said spherical end and axially aligned with the shank of the tool, the said spigot being adapted to enter the conduit 14 whereby to centre the tool in the blank.

The tool is pressed into the floor 13 and thereby displaces material around the end of the conduit 14 so as to form a concave base seating 16, Figs. 4 and 5. The act of displacing the material of the floor 13 to form the seating 16 will at the same time displace the radial edges of the grooves 15 so that the two edges 17, 17 of each groove close on to each other so as to close up the face or side of that portion of the groove located at the seating 16, as shown in Fig. 5, and so form ducts each of which has one end in communication with the conduit 14 and the other end open to the cavity 11 outwardly of the seating 16.

As the two edges 17, 17 of each groove 15 now abut each other along radial lines 18, Fig. 5, a continuous or uninterrupted seating 16 is formed.

The writing ball 19 is then placed in the cavity 11, on the seating 16, and the lip on the outer end of the housing is inturned, as shown at 20 in Fig. 6, to complete the ball housing and retain the ball on the seating.

The writing fluid will flow from the reservoir, along the conduit 14, through the ducts 15 and into the cavity 11 so as to be applied to the ball 19.

Instead of using a tool to form the seating 16, the writing ball 19 may be pressed into the floor 13 at the end of the conduit 14 so as to form the said seating and close up the grooves 15.

Figure 7:
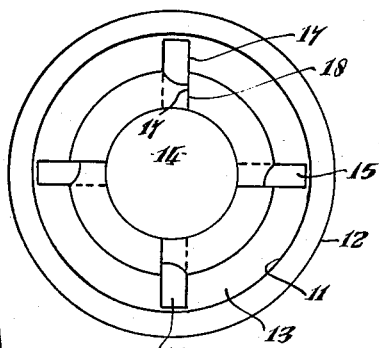
Fig. 7 is a plan view, similar to Fig. 5, but showing a modified form of nib.

In a modified method, illustrated in Fig. 7, a swaging or spinning tool is placed in the cavity 11 and is rotated, or the blank 12 is rotated, so as to form the seating 16. By this means, one radial edge 17 of each groove 15 is displaced circumferentially towards and on to the other radial edge, as shown in Fig. 7, so that the two said edges abut each other along the line 18.

Any combination of pressing, rotating or oscillating, of a tool or the writing ball or of the blank may be used to form the seating 16 and to close up the sides of the grooves 15.

Figure 8:
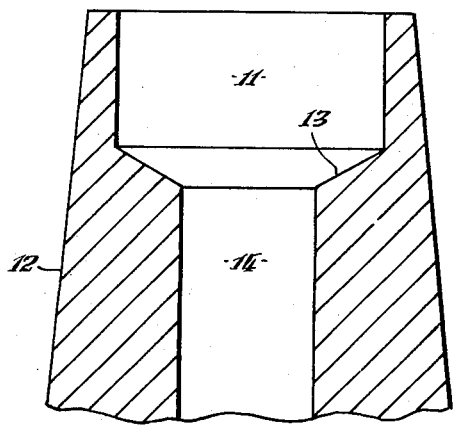
Figs. 8 and 9 are sectional elevations of parts of modified forms of nib, in the same stage of formation as shown in Fig. 1.
Figure 9:
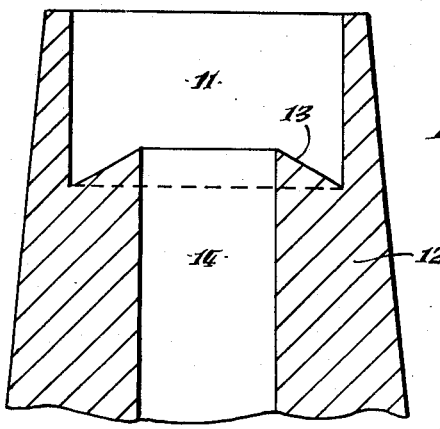

The floor 13 of the cavity 11 initially may be formed concave-conical, as shown in Fig. 8, or, in order to provide sufficient material to enable the edges of the grooves to be closed on to each other, the said floor may be formed convex-conical as shown in Fig. 9.

The walls of the grooves 15 below the seating 16 will be substantially unaffected by the pressing, spinning or swaging operation, so that unobstructed ducts are formed for the flow of ink to the writing ball.

The seating 16 may be frusto-conical.

What I claim and desire to secure by Letters Patent is:

1. A method of making a nib for a ball-pointed writing instrument of the kind provided with a base seating in a housing for the ball and an inturned lip for retaining the ball on the base seating, both the said base seating and the inturned lip providing bearing surfaces for the ball, the said base seating, inturned lip and housing being integral with the said nib, comprising forming a cavity in the writing end of the said nib, forming a conduit which extends axially along the nib from said cavity to the opposite end of the nib, forming at least one channel in the floor of said cavity extending outwardly from said conduit, and displacing the said floor of the cavity to form the base seating for the ball and close the faces of the channels at said seating, thereby providing tubular passages below the base seat bearing surface for the ball, the base seat bearing surface thus formed being continuous.

2. A method according to claim 1, comprising displacing the said floor of the cavity by an axial pressing operation.

3. A method according to claim 1, comprising displacing the said floor of the cavity by a swaging operation.

4. A method according to claim 1, comprising forming the said cavity with a flat floor, that is, a floor which is perpendicular to the axis of the nib.

5. A method according to claim 1, comprising forming the said cavity with a concave-conical floor, that is, a floor which is tapered away from the writing end of the nib.

6. A method according to claim 1, comprising forming the said cavity with a convex-conical floor, that is, a floor which is tapered towards the writing end of the nib.

References Cited in the file of this patent

UNITED STATES PATENTS

| | | |
|---|---|---|
| 2,487,340 | Kleinsmith | Nov. 8, 1949 |
| 2,586,011 | Doelter | Feb. 19, 1952 |
| 2,638,664 | Maxson | May 19, 1953 |
| 2,646,761 | Knobel | July 28, 1953 |
| 2,648,123 | Phillips | Aug. 11, 1953 |
| 2,699,148 | Schweiger et al. | Jan. 11, 1955 |
| 2,718,051 | Cloutier | Sept. 20, 1955 |

FOREIGN PATENTS

| | | |
|---|---|---|
| 660,784 | Great Britain | Nov. 14, 1951 |
| 738,646 | Great Britain | Oct. 19, 1955 |